INVENTORS
William S. Peppler
George N. Bliss
Norman A. Planck, Jr.

ATTORNEY

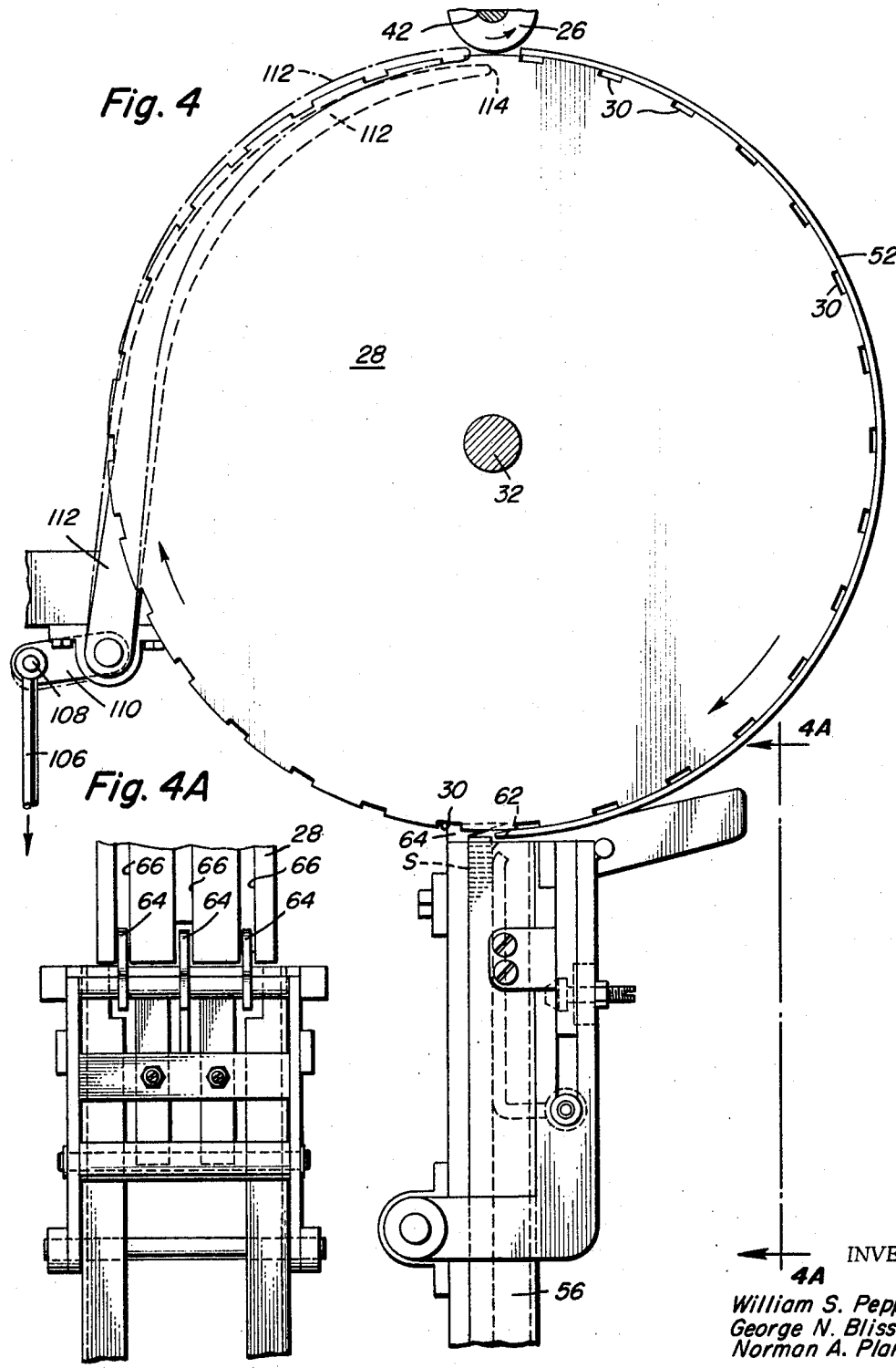

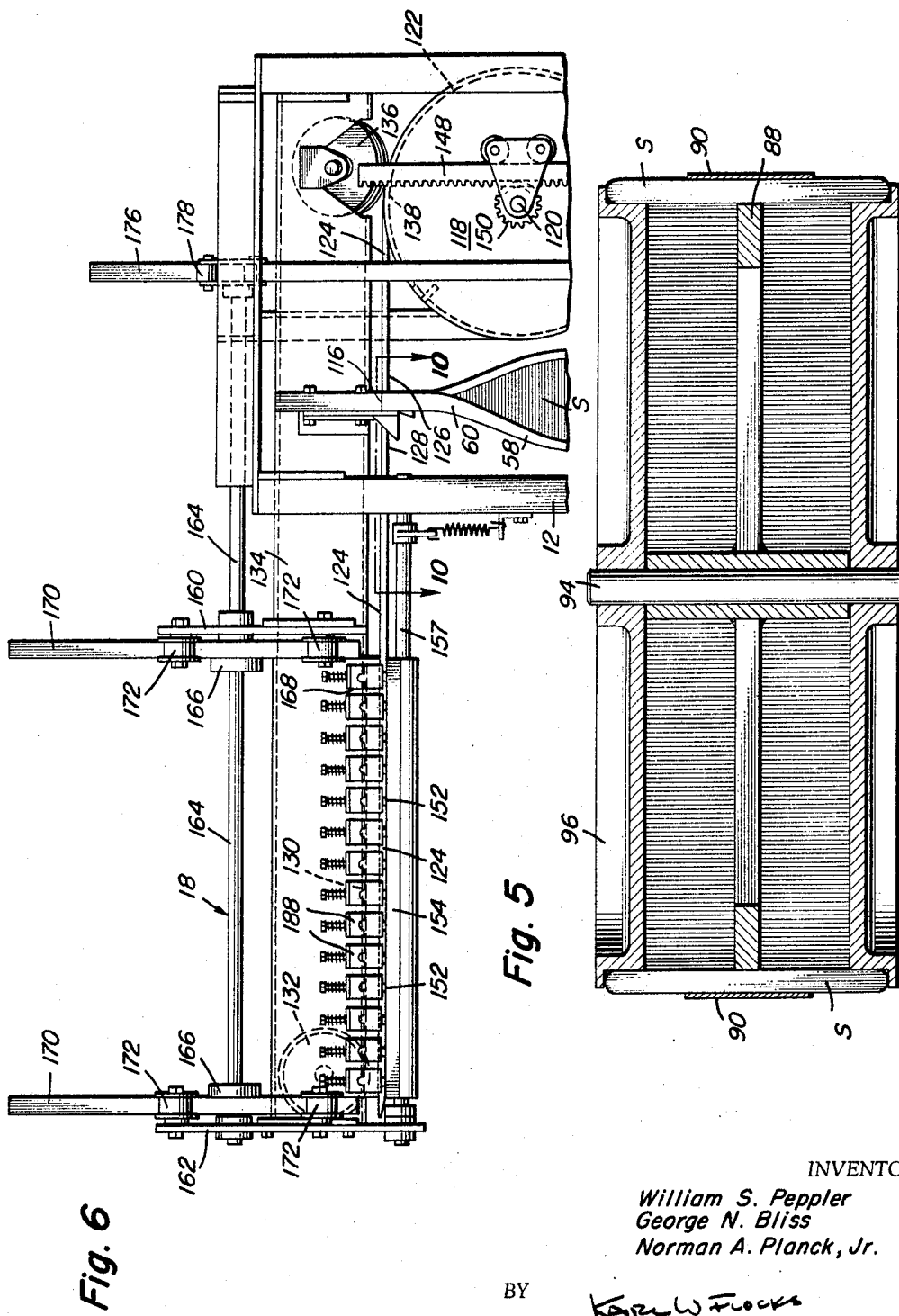

Nov. 18, 1969   W. S. PEPPLER ET AL   3,478,703
STICK INSERTER FOR CONFECTION MACHINE
Filed Dec. 11, 1967   6 Sheets-Sheet 6
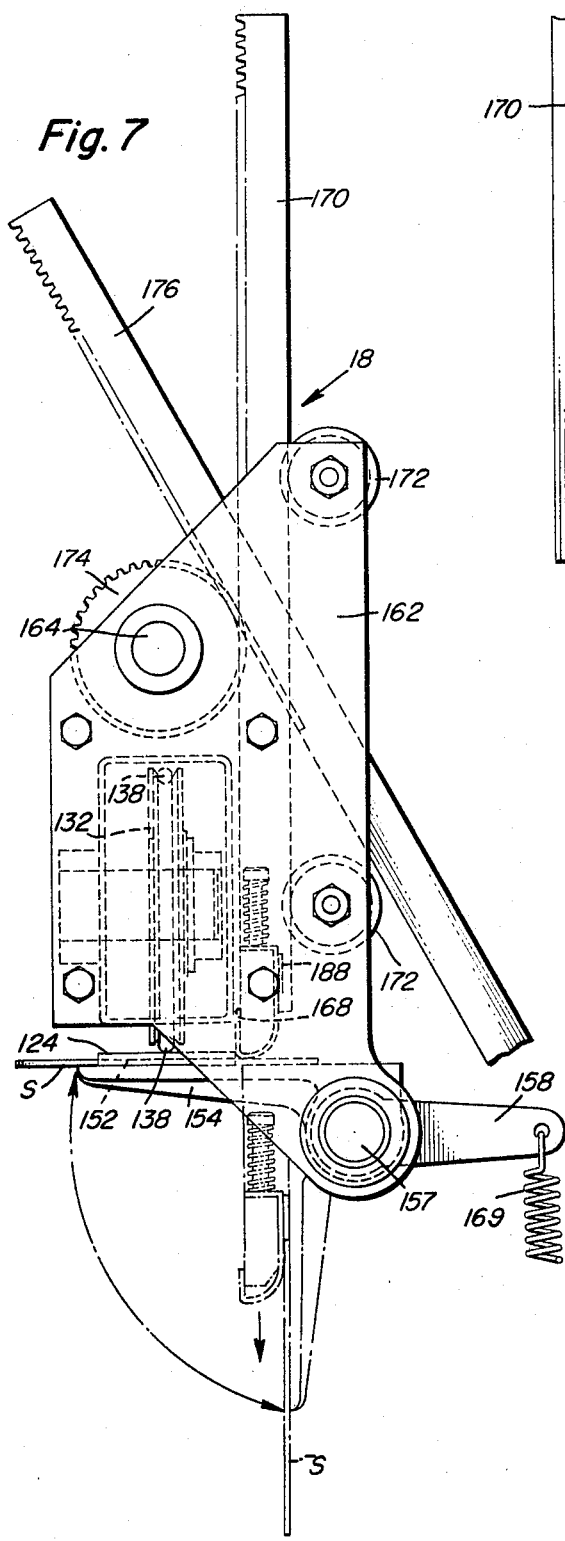
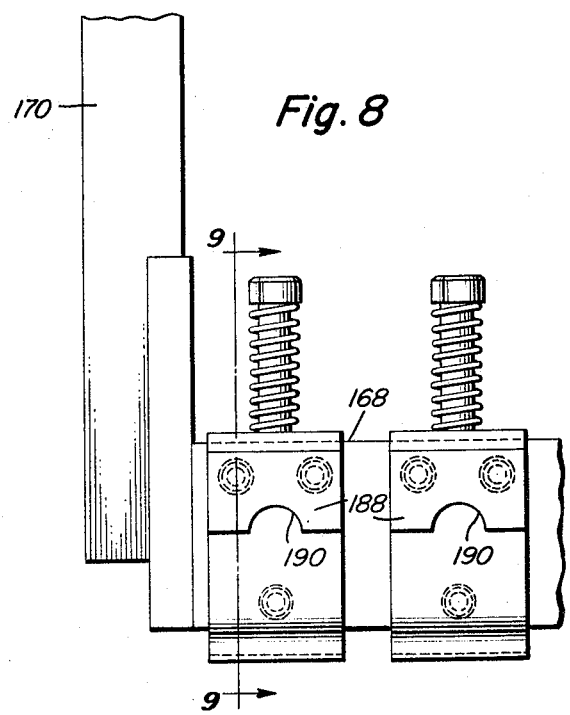
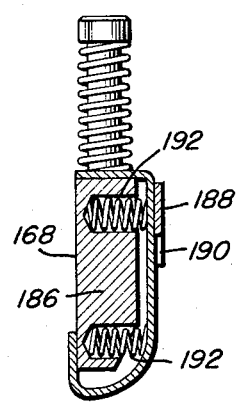
INVENTORS
William S. Peppler
George N. Bliss
Norman A. Planck, Jr.
BY
ATTORNEY 3,478,703
STICK INSERTER FOR CONFECTION MACHINE
William S. Peppler, Chappaqua, N.Y., and George N.
 Bliss, Birmingham, and Norman A. Planck, Jr., Novi,
 Mich., asssignors to Diamond International Corporation, New York, N.Y., a corporation of Delaware
Filed Dec. 11, 1967, Ser. No. 689,566
Int. Cl. F25c 7/22
U.S. Cl. 107—8                        17 Claims

ABSTRACT OF THE DISCLOSURE

A machine for supplying sticks for insertion into confection by taking the sticks from a bulk supply hopper to a surge supply which orients and accumulates the sticks in a variable volume track from where they are removed to inserting means which place the sticks into the confection.

---

This invention relates generally to apparatus to facilitate the mass-production of a confection with a stick or handle protruding therefrom. Typical prior art apparatus is disclosed in the following patents: U.S. Letters Patents to West No. 1,922,563; Anderson No. 2,094,769; and Hoyer No. 3,035,686.

The apparatus of the present invention will be discussed in detail with respect to the mass-production of a frozen confection which will be molded about a stick which projects from one end thereof. However, the stick inserting apparatus, as will be recognized by those skilled in the art, can be used to produce other food products which are molded about a stick or handle.

The typical type of mold with which the present apparatus will be used is illustrated at 1 in the patent to Hoyer No. 3,035,686 and a stick-fitting device is indicated at 4. The apparatus of the present invention will have the same general purpose for functioning in timed relation with the stick-fitting device of the patent to Hoyer No. 3,035,686, and means for timing the operation of co-operating components of the general combination will not be disclosed in this application.

A primary object of the present invention is to provide a stick inserter for confection machines in which a random supply of sticks may be introduced into the machine, are accumulated in a surge supply, are removed from the surge supply, and are subsequently inserted into aligned molds of confection-molding apparatus.

Another object of the present invention is to provide in apparatus of the character mentioned above a surge supply which accumulates a supply of properly oriented confection-sticks independently of confection-stick inserting means whereby the problems of counting or controlling the apparatus, in relation to a predetermined number of sticks or the dimensions of the sticks, is substantially eliminated.

Another object of the present invention is to provide a novel surge-supply for use in apparatus of the character mentioned above in which randomly oriented sticks are received from a bulk-supply and are oriented in a proper position to be removed therefrom by confection-stick inserting means, and the surge-supply provides a sufficient excess of sticks so that reloading of the apparatus, jams, or malfunctions will not interfere with the continued operation of the confection-stick-inserting means.

And yet another object of the present invention is to provide a novel surge-supply of oriented confection sticks in which a variable length path for oriented sticks is supplied, i.e. up to a predetermined maximum, and the oriented sticks are retained in the surge-supply under contant pressure.

A still further object of the present invention is to provide an apparatus of the character mentioned above with a novel stick inserter which includes a semi-rigid belt having transversely disposed slots therein periodically reciprocating past a surge-supply for receiving and transporting sticks to a position for subsequent insertion into a confection mold.

Briefly, the present apparatus will receive a bulk supply of confection sticks in which the packing container may be part of a hopper. The sticks will be properly oriented and transported to a surge-supply which receives, orients, and stores the confection sticks, and in which the operation of the means for inserting a predetermined number of sticks removed from the surge-supply is not predicated in relation to the number of sticks being inserted or the dimensions thereof, and in which the surge-supply has a variable capacity in which oriented sticks are subjected to a constant pressure.

Other and more specific objects and advantages of the present invention will become apparent from a consideration of the following description of an exemplary embodiment when taken in conjunction with the accompanying drawings, in which:

FIG. 4 is an enlarged fragmentary elevation looking at the side of a transport wheel opposite that shown in FIG. 3;

FIG. 4a is a vertical elevation looking substantially from the plane of line 4A—4A of FIG. 4;

FIG. 5 is an enlarged horizontal sectional view taken substantially on the plane of line 5—5 of FIG. 2 through the wheel member of the surge-supply means of the apparatus;

FIG. 6 is an enlarged fragmentary side elevational view looking from left to right into the perspective view of FIG. 2;

FIG. 7 is an enlarged fragmentary end elevational view looking from right to left at the end of the perspective view shown in FIG. 1, showing by means of phantom lines an alternate position of the cooperating parts whereby confection-sticks are inserted by the stick inserter;

FIG. 8 is an enlarged fragmentary elevational view looking from right to left at a terminal end portion of the stick inserter of FIG. 7;

FIG. 9 is a vertical sectional view taken substantially on the plane of line 9—9 of FIG. 8; and FIG. 10 is a fragmentary plan view taken substantially on the plane of line 10—10 of FIG. 6 and showing the manner in which confection sticks are oriented as they are removed from the surge-supply means by the stick inserter.

Figure 1:
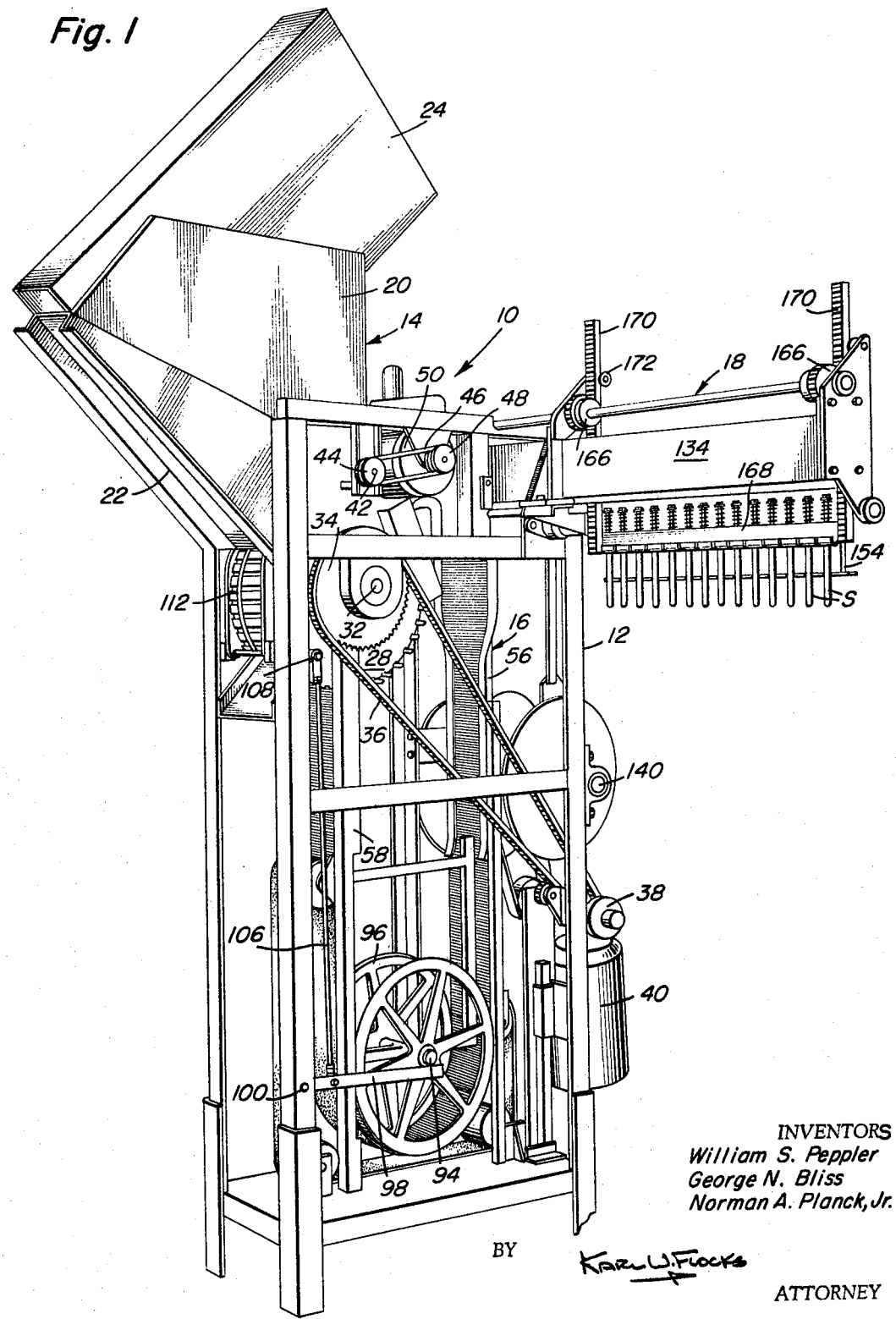
FIG. 1 is a perspective view of the apparatus of the invention.

Referring to the drawings in detail, and first considering FIG. 1, the novel apparatus is indicated generally at 10 and comprises on a suitable support frame 12 confection-stick, bulk-supply means indicated generally at 14 from which randomly-oriented confection sticks are removed and are receive din a confection-stick, surge-supply means indicated generally at 16 in which confection sticks are oriented and accumulated in a variable-volume track from which they are removed and transported to confection-stick inserting means indicated generally at 18.

The confection-stick, bulk-supply means 14 comprises a pair of vertical support plates 20 (only one being shown) and includes a downwardly converging hopper portion 22 which receives therein an open-ended container or box 24 which forms a part of the hopper when open at one and is inverted and supported by the support plates 20 so confection-sticks pour therefrom. In this respect the box or container 24 serves to form a portion of the bulk-supply means. The hopper 22 has extending transversely of the lower portion thereof a suitably journalled, kicker-wheel 26 which is disposed in substantial tangential relationship to an underlying transport wheel 28 which is journalled on the frame 12 on an axis of rotation parallel to that of the kicker-wheel 26. The transport-wheel 28 has formed therein circumferentially spaced transverse grooves 30 and the wheel will rotate in a counterclockwise direction as indicated by the arcuate direction arrow in FIG. 2. The wheel 28 (see FIG. 1) includes on the shaft 32, upon which it is mounted, a sprocket wheel 34 over which is entrained an endless drive chain 36 drivingly connected to a driving sprocket 38 driven by a motor 40 mounted on the frame 12. The kicker-wheel 26 is mounted on a shaft 42 which has a pulley 44 fixed thereto, this pulley having a drive belt 46 entrained thereover and connected to a driving pulley 48 connected to a driving motor 50. The kicker-wheel 26 is generally rotated at a greater peripheral speed than the transport wheel.

Suitably supported in overlying relationship to the outer peripheral portion of the transport wheel 28 (see FIGS. 2–4) are arcuate strip elements 52 which extend from the kicker-wheel 26 to a substantially diametrically opposed position therebelow and the strip elements 52 overlie the grooves 30 in the transport wheel to retain confection-sticks S in the grooves 30 with terminal ends thereof projecting laterally beyond opposite sides of the transport-wheel 28.

The kicker-wheel, mentioned above, is driven more rapidly than the transport-wheel and rotates in a direction opposite that of the transport wheel to insert single sticks into the grooves 30 of the transport wheel. When the sticks S are received in the grooves 30 of the transport wheel they are retained beneath the strips 52 and transported by the wheel 28 to the confection-stick, surge-supply means 16.

As will subsequently be described in detail with respect to FIGS. 4 and 4a, abutment means are provided in the path of travel of the peripheral grooves in the transport wheel 28 for removing and urging the sticks S into the surge-supply means 16.

The surge-supply means 16 includes suitably mounted, opposed and substantially relatively parallel track elements 56 and 58, the latter having an intermediate, substantially 90° twist at 60 for positioning the confection sticks S in a proper position to be removed from the surge-supply means. The track elements 56 and 58 have inwardly directed flanges and define a vertical path having a cross section substantially conforming to the dimensions of the confection-sticks S which will extend transversely therein. The track element 56 includes an upper inlet portion 62 which has fixed thereto, and projecting thereabove, a plurality of transversely spaced abutment portions 64 which project into circumferential grooves 66 formed about the outer periphery of the transport-wheel 28 (see FIG. 4a). The grooves 66 are in intersecting relationship with respect to the transverse grooves 30 in the outer periphery of the transport wheel 28. As sticks are received in the grooves 30, i.e. in the 180° sector from the kicker-wheel 26 to the inlet portion 62 of the track element 56, they are retained in the grooves 30, as previously mentioned by the track elements 52. However, the sticks, upon engaging the abutment 64, will be biased into the upper end of the track element 56 and continued rotation of the transport wheel 28 continues to force these sticks downwardly into the track element 56.

The frame 12 has suitably journalled thereon a pair of idler support pulleys 70 and 72 adjacent to and disposed outwardly of the rail elements 56 and 58, respectively, and an upper idler pulley 74 overlies the pulley 70. Suspended on a pair of support pulleys 76 and 78 is an elongated cable 80 to which is connected a tensioning-weight 82. The cable 80 has connected to the other end a bifurcated suspension bracket or yoke 84, upon which is journalled a pulley 86. The pulleys 70–78 and 86 are all disposed on mutually parallel axes of rotation. An elongated, endless, flexible suspension belt 88 is entrained beneath the pulleys 70 and 72, and over the pulleys 74 and 86, and includes an intermediate slack portion 90 which is of a variable length depending on the number of confection sticks disposed in the surge-supply means 16.

Extending beween track elements 56 and 58 is a frame member 92 upon which is journalled at 94 a peripherally flanged wheel 96 which extends transversely between the lower ends of the track elements 56 and 58. The frame 92 and wheel 96 will be suspended on the slack portion 90 of the belt 88, and as seen in FIG. 5, will receive a plurality of sticks about the circumferential portion thereof that extends between the track elements 56 and 58.

As previously mentioned, confection-sticks S will be removed from the transport wheel 28 and urged into the track element 56 where they are disposed in juxtaposed, stacked, aligned relationship. The wheel 96 may be initially disposed in the solid line position shown in FIG. 3, and as confection sticks accumulate in the surge-supply means 16, the wheel 96 will move downwardly as the surge-supply means accumulates more sticks. When the surge-supply means 16 is filled to its maximum capacity, means, to be subsequently described, is provided to prevent any more sticks from being forced into the track element 56 until some of the confection-sticks have been removed therefrom.

The just-mentioned means for preventing the sticks from being deposited on the transport wheel 28 consists of a lever 98 pivotally mounted at 100 on the support frame 12 and includes a terminal end portion 102 disposed in the path of travel of the shaft 94 of the wheel 96. The lever 98 has pivotally connected thereto at 104 an elongated force transmitting rod 106 which is pivotally connected at 108 for a suitably supported lever 110 (see FIGS. 3 and 4) which has fixed thereto an elongated finger element 112 which has a terminal end portion 114 disposed beneath the kicker-wheel 26.

When the surge-supply means 16 is filled to its maximum capacity, the hub 116 of the wheel 96 (see FIG. 3) will engage the lever 98, causing the force transmitting element 106 to pivot the terminal end 114 of the finger element 112 upwardly into the phantom line position shown in FIG. 4 to accordingly prevent confection-sticks from being urged into grooves 30 of the transport wheel 28.

The 90° twist portion 60 of the track element 58 has an exit end 116 from which individual confection sticks will be removed one-by-one from the confection-stick inserting means 18. The confection stick inserting means 18 includes a drum 118 suitably journalled on the frame 12 on a support shaft 120 and has convolutely disposed thereabout a flexible belt 122 which is constructed of "Teflon" or the like and which has a terminal end portion 124 extendible in overlying relationship above the exit end 116 of portion 60 of the track element 58. The portion 124 of the belt 122 has spaced longitudinally therealong on the lower surface thereof a plurality of transverse grooves 152 which open downwardly toward the exit end 116 and receive therein the sticks S which are subjected to the pressure imposed by the weight 82 on the sticks accumulated in the surge-supply means 16. Suitable support plates 126 and 128 are provided beneath the belt portion 124 on opposite sides of the exit end 116 of the track element 58 to maintain the sticks in the grooves of the track element as it is reciprocated from right to left as seen in FIG. 6, for example.

The terminal end of the belt portion 124 is connected to a flexible force transmitting element 130 which is entrained over a support pulley 132 suitably journalled on a laterally extending frame member 134. The flexible force transmitting element 130 includes an upper run which in turn is journalled over a support pulley 136 disposed in overlying relationship with respect to the drum 118. The flexible force transmitting element 130 is connected to the drum 118 and is received in a peripheral groove 138 at one side thereof. As the belt 122 is unwound off the drum 118, the flexible force transmitting cable 130 is wound into peripheral groove 138 of the drum. In this manner, although the belt 122 is flexible and capable of being wound and unwound onto and off the drum 118, it is still maintained in an extended substantially horizontal position for the purpose of transporting sticks S received from the exit end 116 of the track element 56.

A drive or control shaft 140 is drivingly connected to the motor 40 in any suitable manner. The shaft 140 has fixed thereto a suitably designed control cam 144 peripherally contacted by a suitably supported follower element 146 including a gear rack portion 148 at its upper end. The shaft 120 of the drum 118 includes, in meshed engagement with the gear rack portion 148, a gear wheel 150. As the shaft 140 is rotated, the follower 146 and gear rack 148 will reciprocate and accordingly cause rotation of the drum 118, i.e. unwinding of the belt 122, and the cam 144 is so designed as to cause reciprocatory movement to the gear rack 148 during its rotation to accordingly cause reverse rotation of the drum and rewinding of the belt 122 onto the drum 118. In this manner, the belt portion 124 will be periodically reciprocated back and forth in overlying relationship with respect to the exit end 116 of the track element 158, and in this manner confection-sticks S one by one are biased therefrom into the grooves 152 in the undersurface of the belt portion 124 as they align with the exit portion 116.

Considering FIG. 10, a fragmentary portion of the belt portion 124 is shown and the transverse grooves 152 therein are indicated by means of a dotted line. The stick S is received in the groove 152 with terminal ends thereof extending beyond opposite side edge portions of belt portion 124. An angularly disposed, adjustable abutment bar 154 extends toward the peripheral edge of the belt 124, and as the belt moves from right to left as seen in FIG. 10, the sticks will be oriented as required beyond the edge 156 of the belt (see S', for example).

The stick-inserter per se includes a support shaft 157 which is suitably journalled on the support frame in parallel relationship to a laterally extending frame member 134. Fixed to the shaft 157 is a radially projecting support plate 154 which is normally disposed in a horizontal position and which includes in spaced relationship therealong, in underlying relationship to the path of travel of the belt portion 124, a plurality of grooves or slots 156 which will receive therein terminal ends of the confection-sticks that are being transported by the belt portion 124 as it moves toward the outer or terminal end of the stick inserter frame member 134. The shaft 157 has fixed thereto a radially extending lever 158 to which is connected a suitably anchored tension spring 160. The support member 134 has vertically extending therefrom a pair of support plates 160 and 162 having journalled thereacross an operating shaft 164 having fixed thereto a pair of spaced gear wheels 166.

Figure 2:
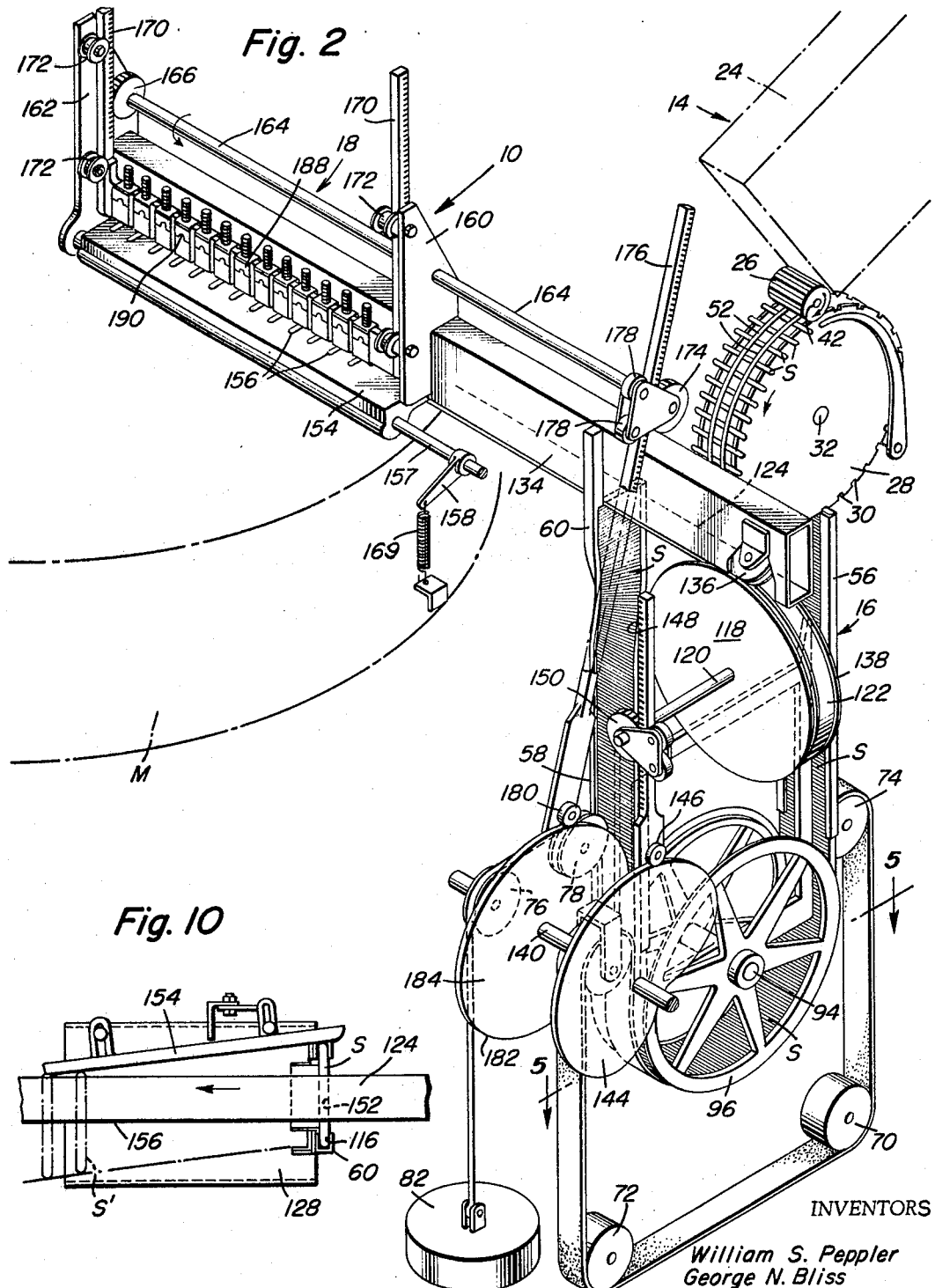
FIG. 2 is a perspective view looking at the side opposite that shown in FIG. 1, with portions of the frame removed for the purpose of showing details, and illustrating by means of phantom lines the relative position of an ice cream mold and a container in which a bulk supply of unoriented confection sticks is stored originally.
Figure 3:
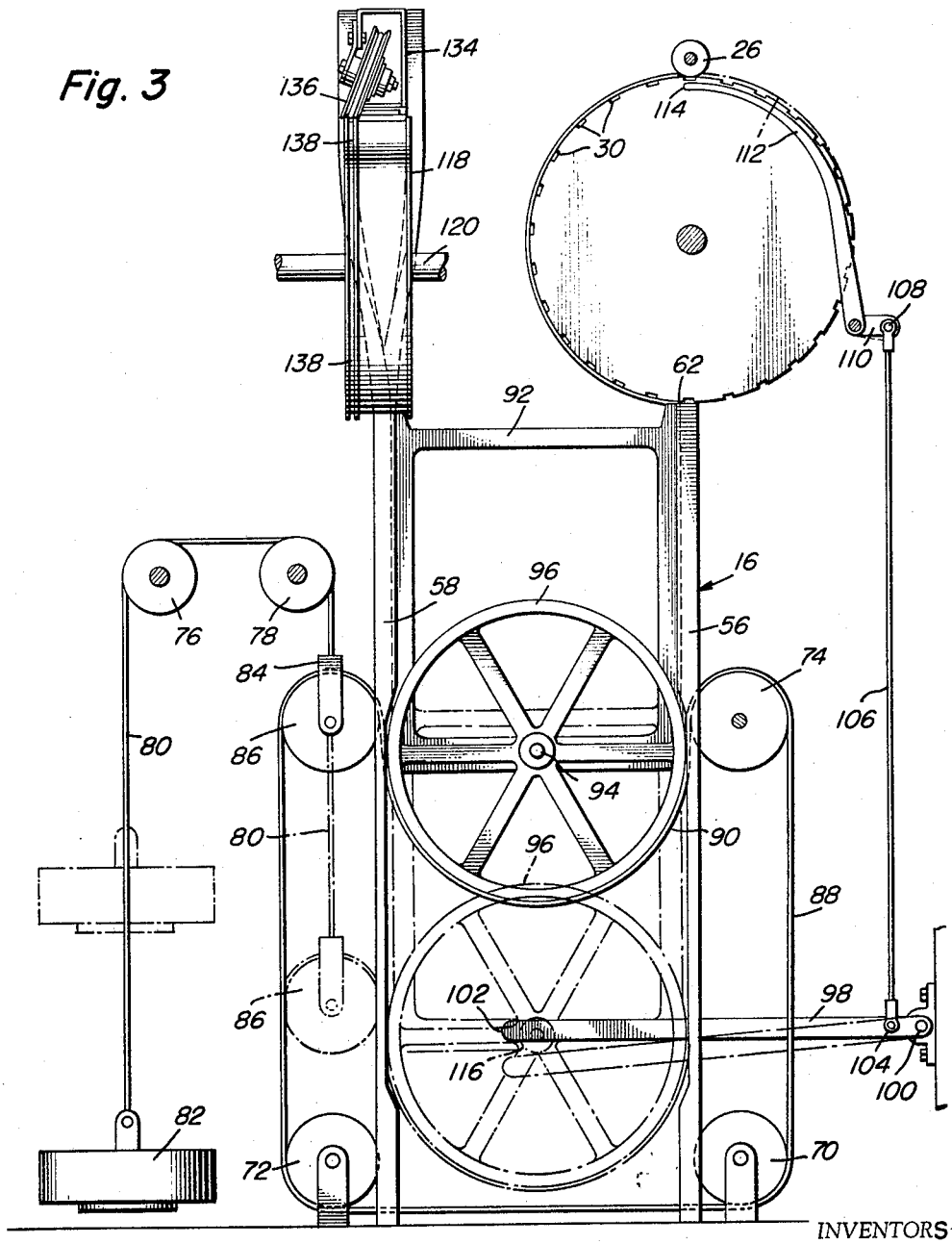
FIG. 3 is an end elevation looking substantially from the near side of FIG. 2, with portions removed for the purpose of showing details.

A reciprocable support frame member 168 includes at opposite ends thereof vertically extending gear racks 170 guidinly retained by a roller element 172 on the plates 160 and 162, respectively. As seen in FIG. 2, the assembly 168 is normally supported adjacent the upper surface of the plate 154. However, when the shaft 164 is rotated in the manner indicated by the arcuate direction arrow, the member 168 will move downwardly against the tension imposed by spring 169 on the shaft 157, i.e., on plate 154, and as will subsequently be described in detail, sticks disposed in notches 156 will be urged into aligned mold pockets (not shown) of the mold M (see FIG. 2).

The shaft 164 includes on the terminal ends thereof a gear wheel 174 in meshed engagement with a reciprocable gear rack 176 guidingly engaged by roller element 178. The gear rack 176 includes a lower cam follower 180 engaging the outer periphery 182 of a suitably designed cam disc 184 mounted on the operating shaft 140. As the shaft 140 is rotated, the periphery 182 of the cam disc 184 is so designed as to cause periodic reciprocation of the gear rack 176, accordingly causing the shaft 164 to rotate in the manner indicated in FIG. 2 to cause the assembly 168 to move downwardly and subsequently move upwardly during a cycle of rotation of the cam disc 184. Support member 168 of the stick inserter comprises a support bar 186 to which a plurality of spaced abutment elements 188 are mounted by which a plurality of longitudinally spaced abutment elements 188 are mounted which include downwardly opening notch portions 190 which will receive therein upper terminal end portions of the confection-sticks S.

When the belt portion 124 is in overlying relationship to the upper surface of the plate 154, the cam disc 184 will cause the gear rack 176 to move downwardly to cause the support 168 to move downwardly. When this occurs, confection-sticks disposed in the notches or grooves 156 will be pivoted with the upper ends thereof engaging in notches 190 of the abutment elements 188. The abutment elements 188 are spring urged outwardly as indicated at 192 in FIG. 9, to accordingly clamp the sticks between the support bar 186 and the upper surface of the plate 154 as it is being pivoted about its support shaft 152 against the tension of spring 160. Continued downward movement of the support 168 causes the abutment elements 168 to move to the phantom line position shown in FIG. 7, and in this position the sticks S will ultimately be received in the aligned mold pockets of the mold M.

Operation in review

Initially, a container 24 of confection-sticks is opened and inverted into the hopper and the kicker wheel 26 causes sticks to enter the individual grooves 30 of the transport wheel 28 and continues to deposit them into the entrance end 62 of the track element 56 when the sticks in the grooves 30 engage the abutment 64 projecting above the entrance end 62 of the track element 56.

The track elements 56 and 58, together with the wheel member 96, provide a variable-capacity of surge-supply in which confection sticks S accumulate until the sticks extend the entire length of the track elements 56 and about the lower peripheral portion of the wheel 96, and continue vertically through the track element 58 to the upper exit portion 116 thereof.

After the surge-supply means 16 is filled in the manner just described, the shaft 140 will rotate and the belt 122, with its extendible portion 124, is reciprocated in overlying relationship across the top of the exit end 116 of portion 60 of the track element 58.

Sticks are received in the grooves 152 by the belt portion 124 and are carried into alignment with the abutment elements 168, i.e., into alignment with grooves or slots 156 of the stick inserter means 18. At the time the sticks S are engaged by elements 158 the return reciprocation of the belt portion 124 results, due to the design of the cam 144 and reciprocation of the gear rack 148, which positions the belt portion 124 to a position to be refilled by sticks S.

After the sticks are aligned with the abutment elements 188, the cam disc 184 continues to cause the gear rack 176 to rotate the shaft 164 counterclockwise as indicated in FIG. 2, resulting in the support 168 moving downwardly, causing the plate 154, upon which sticks are disposed, to pivot downwardly wherein the upper ends of the sticks are engaged by the notches 190 of the abutment elements 188 for insertion into suitable mold compartments.

The cam 144 is so designed as to retract the belt portion 124, i.e., rewind it on the drum 118 before final downward movement of the support 168 occurs.

It will be noted that the surge-supply means 16 operates substantially independently of the stick inserting means 18 and in this manner, there is maintained a surplus supply of oriented sticks under pressure so that the containers 24 may be replaced, i.e., the bulk supply of confection sticks may be replenished without interrupting insertion of sticks into the mold compartments.

What is claimed is:

1. Apparatus for assembling and inserting confection sticks comprising, in combination, bulk supply means for receiving a randomly-oriented supply of elongated confection sticks;

surge-supply means of varying storage capacity communicating with said bulk supply means and including means for assembling, orienting and storing confection sticks in an overlying continuous stack up to a predetermined number of sticks; and confection stick inserting means communicating with said surge supply means and including means for removing a predetermined quantity of confection sticks from said surge supply means.

2. The apparatus as claimed in claim 1 in which said surge supply means for assembling, orienting and storing confection sticks comprises track means defining a variable-volume track for assembling, orienting and storing said confection sticks.

3. The apparatus as claimed in claim 2 in which said track means for assembling, orienting and storing said confection sticks includes a pair of vertically extending relatively spaced track elements, one of said track elements communicating with said bulk supply means and the other of said track elements communicating with said confection stick inserting means, a wheel member extending between said track elements and including a circumferential track portion defining a continuation of the paths of travel of said track elements at the lower end thereof, and a flexible belt having a slack portion draped beneath the circumferential track portion of said wheel and supporting the same for vertical movement beneath said track elements, and means connected to said belt for imposing tension thereto for providing a constant pressure to the confection stick supply disposed in said track elements and about the circumferential track portion of said wheel.

4. The apparatus as claimed in claim 2 including means connected between said track means and said bulk supply means for preventing confection sticks from entering said track means after said track means is filled to its maximum capacity.

5. Apparatus as claimed in claim 1 in which said confection stick inserting means comprises magazine belt means overlying said surge supply means and in communicating relationship therewith, and means connected to said magazine belt means for periodically indexing said magazine belt means relatively to said surge supply means for progressively loading said magazine belt means with confection sticks.

6. Apparatus as claimed in claim 5 in which said confection stick inserting means includes means for removing the confection sticks from said magazine belt means and orienting the sticks into a vertically disposed position and discharging the confection sticks downwardly for receipt in a confection.

7. Apparatus as claimed in claim 5 in which said magazine belt means comprises an elongated, flexible belt having downwardly disposed, transversely extending, longitudinally spaced grooves communicable with surge supply means.

8. The structure as claimed in claim 7 in which said means for periodically indexing said magazine belt means includes a drum about which said flexible belt is convolutely disposed, a flexible force transmitting element extending the length of travel of said flexible belt and connected to said drum for being wound about said drum as said flexible belt is unwound therefrom.

9. The apparatus as claimed in claim 7 in which said means for periodically indexing said belt means includes a drum about which said flexible belt is convolutely disposed, and a flexible force transmitting element extending the length of travel of said flexible belt and connected to said drum for being wound about said drum as said flexible belt is unwound therefrom.

10. In apparatus for assembling and inserting confection sticks, bulk supply means for receiving a randomly oriented supply of confection sticks, and surge supply means communicating with said bulk supply means and including means for assembling, orienting and storing confection sticks and further including means to vary the storage capacity of said last mentioned means.

11. The structure as claimed in claim 10 in which said bulk supply means comprises a downwardly converging hopper having a lower opening for accumulating randomly oriented confection sticks thereat, kicker-wheel means journalled transversely of a lower opening of said hopper, transport wheel means disposed on an axis of rotation parallel to the axis of rotation of said kicker-wheel and in underlying substantial tangential relationship thereto, said transport wheel means including a plurality of circumferentially spaced, transversely disposed grooves extending thereacross for receiving confection sticks therein, said surge supply means including a track element below said transport wheel means and having an upper inlet adjacent the lower periphery of said transport wheel means and alignable with the transverse grooves therein, a guide track element circumposed above a peripheral portion of said transport wheel means and extending from said kicker-wheel means to said inlet end of said track element for retaining confection sticks in the transverse grooves on said transport wheel means, and abutment means extending above said track element inlet and into the path of travel of said transport wheel means for biasing confection sticks out of the transport wheel means grooves and into said track element inlet.

12. The structure as claimed in claim 11 including means connected between said surge means and including a stop element extending into the lower end of said hopper adjacent said kicker-wheel means for preventing sticks from entering the transport wheel grooves after said surge supply means is filled to a maximum with the confection sticks.

13. The structure as claimed in claim 10 in which said surge supply means comprises a pair of spaced, vertically disposed track elements for receiving juxtaposed confection sticks therein, a wheel extending transversely between lower end portions of said track elements and including a circumferential track portion defining a continuation of the path of travel of said track elements and connecting the same, and a flexible belt having a slack portion draped beneath said circumferential track portion of said wheel and supporting the wheel for vertical movement between said track elements, and means connected to said belt for imposing tension thereto and pressure to the sticks disposed in said track elements whereby said belt and wheel provide a variable-capacity path to accommodate oriented confection sticks up to a predetermined maximum.

14. The structure as claimed in claim 11 including means connected between said surge supply means and said bulk supply for preventing confection sticks from entering said track elements after said surge supply means is filled up to its maximum capacity with said confection sticks.

15. In apparatus for assembling and inserting confection sticks, confection sticks supply means including means for retaining a plurality of confection sticks in aligned, stacked relation under pressure, and confection sticks inserting means communicating with said confection stick supply means for removing confection sticks therefrom one by one, said confection stick inserting means comprising magazine belt means overlying said supply means and in communicating relationship therewith, and means connected to said magazine belt means for periodically indexing said magazine belt means relative to said supply means for progressively loading said magazine belt means with a predetermined number of confection sticks.

16. The structure as claimed in claim 13 in which said confection stick inserting means includes means for removing the sticks from said magazine belt means and orienting the sticks into a vertically disposed position and discharging the sticks downwardly for receipt in a confection.

17. The structure as claimed in claim 14 in which said magazine belt means comprises an elongated flexible belt having downwardly disposed, longitudinally spaced grooves for communicating with said supply means.

References Cited
UNITED STATES PATENTS

| | | | |
|---|---|---|---|
| 1,550,070 | 8/1925 | Goss | 107—8.1 |
| 1,594,418 | 8/1926 | Krout | 107—8.1 |
| 1,814,008 | 7/1931 | Parnell | 107—8.1 |

WALTER A. SCHEEL, Primary Examiner

R. I. SMITH, Assistant Examiner